United States Patent
Chen et al.

(10) Patent No.: US 12,555,782 B2
(45) Date of Patent: Feb. 17, 2026

(54) NEGATIVE ELECTRODE PLATE, ELECTROCHEMICAL DEVICE, AND ELECTRONIC DEVICE

(71) Applicant: Ningde Amperex Technology Limited, Fujian (CN)

(72) Inventors: Zhihuan Chen, Ningde (CN); Daoyi Jiang, Ningde (CN)

(73) Assignee: NINGDE AMPEREX TECHNOLOGY LIMITED, Ningde (CN)

(*) Notice: Subject to any disclaimer, the term of this patent is extended or adjusted under 35 U.S.C. 154(b) by 227 days.

(21) Appl. No.: 18/343,306

(22) Filed: Jun. 28, 2023

(65) Prior Publication Data
US 2023/0343944 A1  Oct. 26, 2023

Related U.S. Application Data

(63) Continuation of application No. PCT/CN2020/140363, filed on Dec. 28, 2020.

(51) Int. Cl.
*H01M 4/38* (2006.01)
*H01M 4/02* (2006.01)
(Continued)

(52) U.S. Cl.
CPC .......... *H01M 4/386* (2013.01); *H01M 4/133* (2013.01); *H01M 4/134* (2013.01); *H01M 4/587* (2013.01);
(Continued)

(58) Field of Classification Search
None
See application file for complete search history.

(56) References Cited

U.S. PATENT DOCUMENTS 12,100,833 B2 * 9/2024 Yan ................. H01M 4/386
12,294,082 B2 * 5/2025 Yi .................. H01M 10/0525
(Continued)

FOREIGN PATENT DOCUMENTS

CN        102881870 A      1/2013
CN        105742640 A      7/2016
(Continued)

OTHER PUBLICATIONS

International Search Report, issued on Sep. 23, 2021, in corresponding International Patent Application No. PCT/CN2020/140363, 6 pages.
(Continued)

*Primary Examiner* — Kevin M Bernatz
(74) *Attorney, Agent, or Firm* — Maier & Maier, PLLC (57) ABSTRACT

A negative electrode plate includes: a current collector; and an active material layer, located on the current collector. The active material layer includes a silicon-based material, a carbon material, and a binder. Silicon mass fractions in two places of the active material layer are $X_1$ and $X_2$; the two places cover a same area but are located in different positions, $X_2 \geq X_1$, $M = X_1/X_2$, and $M \geq 0.7$. Lithium mass fractions in the two places are $Y_1$ and $Y_2$, respectively; the two places cover the same area but are located in different positions, $Y_2 \geq Y$, $N = Y_1/Y_2$, and $N \geq 0.5$. Also, uniformity of deintercalation and intercalation of lithium is enhanced by improving the dispersion uniformity of silicon in the active material layer, thereby alleviating volume expansion of the silicon-based material during cycling, and enhancing cycle performance and safety performance of the electrochemical device.

14 Claims, 3 Drawing Sheets

(51) Int. Cl.
*H01M 4/133* (2010.01)
*H01M 4/134* (2010.01)
*H01M 4/587* (2010.01)
*H01M 4/62* (2006.01)

(52) U.S. Cl.
CPC .......... *H01M 4/622* (2013.01); *H01M 4/625* (2013.01); *H01M 2004/027* (2013.01)

(56) References Cited

U.S. PATENT DOCUMENTS

| | | | |
|---|---|---|---|
| 2004/0062991 | A1 | 4/2004 | Fukui et al. |
| 2020/0212438 | A1 | 7/2020 | Lee et al. |
| 2022/0216477 | A1* | 7/2022 | Zhao ............... H01M 4/625 |
| 2023/0021755 | A1* | 1/2023 | Chen ............... H01M 4/483 |
| 2024/0072310 | A1* | 2/2024 | Kim ............... H01M 4/62 |
| 2024/0213462 | A1 | 6/2024 | Luo ............... H01M 4/36 |
| 2024/0222637 | A1* | 7/2024 | Wan ............... H01M 4/366 |
| 2025/0266457 | A1* | 8/2025 | Xiao ............... H01M 4/38 |

FOREIGN PATENT DOCUMENTS

| | | | |
|---|---|---|---|
| CN | 107394187 | A | 11/2017 |
| CN | 107946561 | A | 4/2018 |
| CN | 109755500 | A | 5/2019 |
| CN | 110323415 | A | 10/2019 |
| CN | 110911635 | A | 3/2020 |
| CN | 111403693 | A | 7/2020 |
| EP | 3913706 | A1 * | 10/2021 ............ H01G 11/06 |
| JP | 2015053152 | A | 3/2015 |
| JP | 2015088462 | A | 5/2015 |

OTHER PUBLICATIONS

Office Action issued on Aug. 3, 2022, in corresponding Chinese Patent Application No. 202080027248.0, 19 pages.

Office Action issued on Feb. 28, 2023, in corresponding Chinese Patent Application No. 202080027248.0, 18 pages.

Reexamination Decision issued on Aug. 26, 2024, in corresponding Chinese Application No. 202080027248.0, 36 pages with partial translation.

Notice of Reexamination issued on May 16, 2024, in corresponding Chinese Application No. 202080027248.0, 16 pages.

Rejection Decision issued on Jul. 27, 2023, in corresponding Chinese Application No. 202080027248.0, 12 pages.

Office Action issued on Aug. 6, 2024, in corresponding Japanese Application No. 2023-538985, 9 pages.

Office Action issued on Feb. 25, 2025, in corresponding Japanese Application No. 2023-538985, 6 pages.

Office Action issued on Jun. 3, 2025, in corresponding Japanese Application No. 2023-538985, 6 pages.

* cited by examiner

NEGATIVE ELECTRODE PLATE, ELECTROCHEMICAL DEVICE, AND ELECTRONIC DEVICE

CROSS REFERENCES TO RELATED APPLICATIONS

This present application is a continuation application of PCT/CN2020/140363, filed on Dec. 28, 2020, the disclosure of which is hereby incorporated by reference in its entirety.

TECHNICAL FIELD

This application relates to the field of electrochemical energy storage, and in particular, to a negative electrode plate, an electrochemical device, and an electronic device.

BACKGROUND

With the advancements of electrochemical devices (such as a lithium-ion battery), higher requirements have been imposed on the safety performance and cycle performance of the electrochemical devices. Although the current techniques for improving the electrochemical devices can improve the safety performance and cycle performance of the electrochemical devices to some extent, the improvement is still unsatisfactory and more improvements are expected.

SUMMARY

An embodiment of this application provides a negative electrode plate, including: a current collector; and an active material layer. The active material layer is located on the current collector. The active material layer includes a silicon-based material, a carbon material, and a binder. Mass fractions of silicon in two places of the active material layer are $X_1$ and $X_2$ respectively, the two places cover a same area but are located in different positions, $X_2 \geq X_1$, $M=X_1/X_2$, and $M \geq 0.7$. Mass fractions of lithium in the two places of the active material layer are $Y_1$ and $Y_2$ respectively, the two places cover the same area but are located in different positions, $Y_2 \geq Y_1$, $N=Y_1/Y_2$, and $N \geq 0.5$.

In some embodiments, a mass percent of the silicon-based material in the active material layer is 2% to 80%. In some embodiments, the binder includes a lithium salt component. In some embodiments, a mass percent of the binder in the active material layer is 0.5 wt % to 10 wt %. In some embodiments, the silicon-based material includes at least one of Si, $SiO_x$, $SiO_2$, SiC, $Li_2SiO_5$, $Li_2SiO_3$, $Li_4SiO_4$, or silicon alloy, and $0.6 \leq x \leq 1.5$. In some embodiments, a particle size of Si is less than 100 nm. In some embodiments, in an X-ray diffraction pattern of the silicon-based material, a maximum intensity value is $I_1$ when $2\theta$ falls within a range of 20.5° to 21.5°, and the maximum intensity value is $I_2$ when $2\theta$ falls within a range of 28.0° to 29.0°, satisfying $0<I_2/I_1\leq 1$. In some embodiments, a particle size distribution of the silicon-based material satisfies: $0.3 \leq Dn_{10}/Dv_{50} \leq 0.6$. In some embodiments, an average particle diameter of the silicon-based material is 500 nm to 30 μm.

In some embodiments, the binder includes at least one of carboxymethyl cellulose, polyacrylic acid, polyvinylpyrrolidone, polyaniline, polyimide, polyamideimide, polysiloxane, polystyrene-butadiene rubber, epoxy resin, polyester resin, polyurethane resin, or polyfluorene. In some embodiments, weight loss ratios of the two places of the active material layer in a thermogravimetric analysis (TG) performed at a temperature less than or equal to 800° C. are $Z_1$ and $Z_2$ respectively, the two places cover the same area but are located in different positions, $Z_2 \geq Z_1$, $K=Z_1/Z_2$, and $K \geq 0.7$. In some embodiments, the active material layer further includes a conductive agent, and the conductive agent includes at least one of single-walled carbon nanotubes, multi-walled carbon nanotubes, vapor grown carbon fibers, conductive carbon black, acetylene black, Ketjen black, conductive graphite, or graphene. In some embodiments, a mass percent of the silicon-based material in the active material layer is 2% to 40%. In some embodiments, the carbon material includes graphite.

Another embodiment of this application provides an electrochemical device, including: a positive electrode plate; a negative electrode plate; and a separator. The separator is disposed between the positive electrode plate and the negative electrode plate. The negative electrode plate is any one of the negative electrode plates described above. An embodiment of this application further provides an electronic device, including the electrochemical device.

In some embodiments of this application, the uniformity of deintercalation and intercalation of lithium is enhanced by improving the dispersion uniformity of silicon in the active material layer of the negative electrode plate, thereby alleviating volume expansion of the silicon-based material during cycling, and enhancing cycle performance and safety performance of the electrochemical device.

DETAILED DESCRIPTION

The following embodiments enable a person skilled in the art to understand this application more comprehensively, but without limiting this application in any way.

To improve the energy density of an electrochemical device, a silicon-based material may be used in an active material layer of a negative electrode plate. However, the silicon-based material changes to a massive degree as high as 300% during cycling, thereby generating a huge mechanical stress (up to 1 GPa). This causes pulverization of the silicon-based material particles and debonding between the active material layer and a current collector, thereby reducing cycle performance of the electrochemical device. In addition, the conductivity of the silicon-based material is low (the electronic conductivity of powder is less than $10^{-7}$ S/cm), thereby causing serious polarization and further reducing the cycle performance of the electrochemical device. To alleviate the volume expansion of the silicon-based material, the silicon-based material is usually used in combination with a carbon material (such as graphite), but the cycle performance and safety performance of the electrochemical device are still expected to be further improved.

By improving the dispersion uniformity of silicon in the negative electrode plate that contains the silicon-based material, the uniformity of distribution of electrical current in the negative electrode plate is improved, the expansion and contraction are more uniform between different regions during charging and discharging, and the polarization is alleviated, thereby enhancing the cycle performance and rate performance of the electrochemical device and alleviating the expansion of an electrode assembly.

Figure 1:
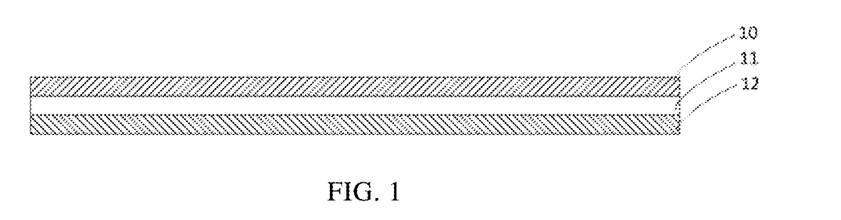
FIG. 1 is a schematic diagram of an electrode assembly of a conventional electrochemical device.

As shown in FIG. 1, an expanded cross-sectional view of a conventional electrochemical device is provided. The electrochemical device may include an electrode assembly. The electrode assembly includes a positive electrode plate 10, a negative electrode plate 12, and a separator 11 disposed between the positive electrode plate 10 and the negative electrode plate 12.

Figure 2:
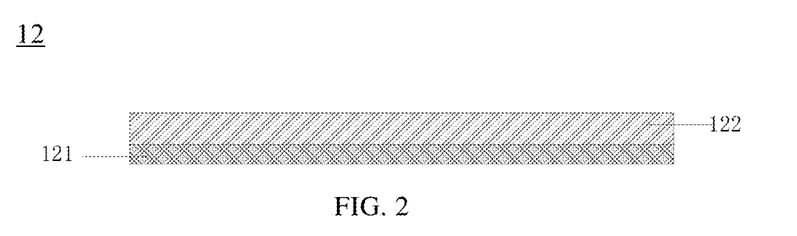
FIG. 2 is a cross-sectional view of a negative electrode plate according to some embodiments.

In some embodiments, as shown in FIG. 2, the negative electrode plate 12 may include a current collector 121 and an active material layer 122 located on the current collector 121. Understandably, although the active material layer 122 shown in FIG. 2 is disposed on just one side of the current collector 121, the arrangement in the drawing is merely exemplary, and the active material layer 122 may be disposed on both sides of the current collector 121 instead. In some embodiments, the active material layer 122 includes a silicon-based material, a carbon material, and a binder.

In some embodiments, mass fractions of silicon in two places of the active material layer 122 are $X_1$ and $X_2$ respectively, the two places cover the same area but are located in different positions, $X_2 \geq X_1$, $M = X_1/X_2$, and $M \geq 0.7$. When M is closer to 1, silicon is distributed more uniformly in the active material layer 122, and the silicon-based material is distributed more uniformly. By improving the dispersion uniformity of silicon in the active material layer 12, the silicon-based material can be more uniformly distributed in the carbon material, and in turn, the carbon material can more effectively suppress or alleviate the problems caused by the volume expansion of the silicon-based material, and the carbon material of excellent conductivity can more effectively overcome or compensate for the low conductivity of the silicon-based material, thereby alleviating the volume expansion of the silicon-based material during cycling, and enhancing the cycle performance and safety performance of the electrochemical device.

In some embodiments, mass fractions of lithium in the two places of the active material layer 122 are $Y_1$ and $Y_2$ respectively, the two places cover the same area but are located in different positions, $Y_2 \geq Y_1$, $N = Y_1/Y_2$, and $N \geq 0.5$. When N is larger or N is closer to 1, lithium is distributed in the active material layer 122 more uniformly, and lithium ions are intercalated and deintercalated more uniformly during cycling, thereby enhancing the cycle performance and safety performance of the electrochemical device. In addition, the uniform distribution of lithium in the active material layer 122 also reflects uniform distribution of the material in the active material layer 122.

In some embodiments, a mass percent of the silicon-based material in the active material layer 122 is 2% to 80%. If the mass percent of the silicon-based material in the active material layer 122 is deficient, for example, lower than 2%, the effect of the silicon-based material is limited in increasing the energy density of the electrochemical device. On the other hand, if the mass percent of the silicon-based material in the active material layer 122 is excessive, for example, higher than 80%, the active material layer 122 may cause large volume expansion due to the high content of the silicon-based material. This is adverse to stability of a solid electrolyte interface (SEI) film of the negative electrode, and may cause excessive consumption of the electrolytic solution. In some embodiments, the mass percent of the silicon-based material in the active material layer 122 is 2% to 40%.

In some embodiments, the binder in the active material layer 122 includes a lithium salt component. In this way, the content of lithium in the negative electrode plate 12 is increased, and in turn, the loss of lithium can be slowed down during cycling, and lithium can be supplemented to enhance the cycle performance of the electrochemical device.

In some embodiments, a mass percent of the binder in the active material layer 122 is 0.5 wt % to 10 wt %. If the mass percent of the binder in the active material layer 122 is deficient, for example, less than 0.5%, the binder is not conducive to bonding between materials, and debonding is prone to occur between the active material layer 122 and the current collector 121. If the mass percent of the binder in the active material layer 122 is excessive, for example, higher than 10%, the energy density of the electrochemical device will be adversely affected.

In some embodiments, the silicon-based material includes at least one of Si, $SiO_x$, $SiO_2$, SiC, $Li_2SiO_5$, $Li_2SiO_3$, $Li_4SiO_4$, or silicon alloy, and $0.6 \leq x \leq 1.5$. In some embodiments, a particle size of Si is less than 100 nm. In some embodiments, the carbon material in the active material layer 122 includes graphite. In some embodiments, the binder includes at least one of carboxymethyl cellulose, polyacrylic acid, polyvinylpyrrolidone, polyaniline, polyimide, polyamideimide, polysiloxane, polystyrene-butadiene rubber, epoxy resin, polyester resin, polyurethane resin, or polyfluorene.

In some embodiments, in an X-ray diffraction pattern of the silicon-based material, a maximum intensity value is $I_1$ when 2θ falls within a range of 20.5° to 21.5°, and the maximum intensity value is $I_2$ when 2θ falls within a range of 28.0° to 29.0°, satisfying $0 < I_2/I_1 \leq 1$. In some embodiments, when the $I_2/I_1$ ratio is lower, the impact on the dispersion uniformity of silicon and the uniformity of lithium is smaller, but the effect is more significant on improving the rate performance and cycle performance of the electrochemical device and alleviating volume expansion during cycling.

In some embodiments, a particle size distribution of the silicon-based material satisfies $0.3 \leq Dn_{10}/Dv_{50} \leq 0.6$. $Dn_{10}$ means a particle diameter measured when a cumulative quantitative percentage of measured particles reaches 10% of the total number of all particles under test in a number-based particle size distribution, and $Dv_{50}$ means a particle diameter measured when a cumulative volume percentage of measured particles reaches 50% of the total volume of all particles under test in a volume-based particle size distribution. In some embodiments, if the $Dn_{10}/Dv_{50}$ ratio of the silicon-based material is deficient, the dispersion uniformity of silicon will be lower. That is, the M value is lower, and the N value is also lower, thereby deteriorating the cycle performance of the electrochemical device. However, the existence of the silicon-based material of a small particle size enhances the rate performance of the electrochemical device. In addition, if the $Dn_{10}/Dv_{50}$ ratio is excessive, the dispersion uniformity of silicon will also deteriorate, and at the same time, the cycle performance, rate performance, and volume expansion of the electrochemical device will deteriorate during cycling.

In some embodiments, an average particle diameter of the silicon-based material is 500 nm to 30 μm. If the average particle diameter of the silicon-based material is deficient, for example, less than 500 nm, then the specific area of the silicon-based material is relatively large, the silicon-based material is prone to agglomerate, and more electrolytic solution needs to be consumed to form an SEI film. If the average particle diameter of the silicon-based material is excessive, for example, greater than 500 nm, the volume expansion of the silicon-based material is relatively large.

In some embodiments, weight loss ratios of the two places of the active material layer 122 in a thermogravimetric analysis (TG) performed at a temperature less than or equal to 800° C. are $Z_1$ and $Z_2$ respectively, the two places cover the same area but are located in different positions, $Z_2 \geq Z_1$, $K=Z_1/Z_2$, and $K \geq 0.7$. When the K value is higher, the binder is distributed more uniformly in the active material layer 122, and the silicon-based material is also distributed more uniformly.

In some embodiments, the active material layer 122 may further include a conductive agent. The conductive agent may include at least one of single-walled carbon nanotubes, multi-walled carbon nanotubes, vapor grown carbon fibers, conductive carbon black, acetylene black, Ketjen black, conductive graphite, or graphene.

In some embodiments, the current collector 121 of the negative electrode plate 12 may be at least one of a copper foil, a nickel foil, or a carbon-based current collector. In some embodiments, a compacted density of an active material layer 122 of the negative electrode plate 12 may be 1.0 g/cm³ to 1.9 g/cm³. If the compacted density of the negative active material layer 122 is deficient, the compacted density may impair the volumetric energy density of the electrochemical device. If the compacted density of the active material layer 122 is excessive, the compacted density is detrimental to conducting lithium ions, and is prone to intensify polarization, impair the electrochemical performance, and incur lithium plating during charging of the electrochemical device. Understandably, the materials disclosed above are merely examples, and the active material layer 122 may be made of any other appropriate materials. In some embodiments, a mass ratio between the negative active material (such as the silicon-based material and the carbon material), the conductive agent, and the binder in the active material layer 122 may be (70 to 98):(1 to 15):(1 to 15). Understandably, what is enumerated above is merely an example, and any other mass ratio may apply as appropriate.

In some embodiments, an embodiments of this application further provides a method for preparing a negative electrode plate. The method includes: mixing a silicon-based material and a carbon material in a first mixing step to obtain a mixed material; mixing the mixed material, a conductive agent, a binder, and a solvent in a second mixing step to obtain a negative slurry; and then coating a negative current collector with the negative slurry, and drying the slurry to obtain a negative electrode plate. In some embodiments, the first mixing step includes: dispersing the mixture at a rotation speed of 10 to 100 r/min for 0.5 h to 2 h. If the first mixing step continues for a deficient time, the mixing step is not conducive to uniformity of the material. If the first mixing step continues for an excessive time, the mixing step is not conducive to improving the manufacturing efficiency. In some embodiments, the second mixing step includes: dispersing the mixture at a rotation speed of 300 to 2500 r/min for 0.5 h to 3 h. If the second mixing step continues for a deficient time, the mixing step is not conducive to uniformity of the material. If the second mixing step continues for an excessive time, the mixing step is not conducive to improving the manufacturing efficiency.

As mentioned above, an embodiment of this application provides an electrochemical device. The electrochemical device includes an electrode assembly. The electrode assembly includes a positive electrode plate 10, a negative electrode plate 12, and a separator 11 disposed between the positive electrode plate 10 and the negative electrode plate 12. The negative electrode plate 12 is any one of the negative electrode plates described above.

In some embodiments, the positive electrode plate 10 includes a positive current collector and a positive active material layer disposed on the positive current collector. The positive active material layer is disposed on one side or both sides of the positive current collector. In some embodiments, the positive current collector may be an aluminum foil, or may be another positive current collector commonly used in the art. In some embodiments, the thickness of the positive current collector may be 1 μm to 200 μm. In some embodiments, the positive active material layer may be coated on merely a local region of the positive current collector. In some embodiments, the thickness of the positive active material layer may be 10 μm to 500 μm. In some embodiments, the positive active material layer includes a positive active material. In some embodiments, the positive active material may include at least one of lithium cobalt oxide, lithium manganese oxide, lithium iron phosphate, lithium nickel cobalt manganese oxide, lithium nickel cobalt aluminum oxide, or lithium nickel manganese oxide. In some embodiments, the positive active material layer further includes a binder and a conductive agent. In some embodiments, the binder in the positive active material layer may include at least one of polyvinylidene difluoride, poly(vinylidene fluoride-co-hexafluoropropylene), poly(styrene-co-acrylate), poly(styrene-co-butadiene), polyamide, polyacrylonitrile, polyacrylic ester, polyacrylic acid, sodium polyacrylate, sodium carboxymethyl cellulose, polyvinyl acetate, polyvinylpyrrolidone, polyvinyl ether, polymethyl methacrylate, polytetrafluoroethylene, or polyhexafluoropropylene. In some embodiments, the conductive agent in the positive active material layer may include at least one of conductive carbon black, Ketjen black, graphite flakes, graphene, carbon nanotubes, or carbon fiber. In some embodiments, a mass ratio of the positive active material, the conductive agent, and the binder in the positive active material layer may be (70 to 98):(1 to 15):(1 to 15). Understandably, what is described above is merely an example, and the positive active material layer may adopt any other appropriate material, thickness, and mass ratio.

In some embodiments, the separator 11 includes at least one of polyethylene, polypropylene, polyvinylidene fluoride, polyethylene terephthalate, polyimide, or aramid fiber. For example, the polyethylene includes at least one of high-density polyethylene, low-density polyethylene, or ultra-high-molecular-weight polyethylene. Especially, the polyethylene and the polypropylene are highly effective in preventing short circuits, and can improve stability of the battery through a turn-off effect. In some embodiments, the thickness of the separator is within a range of approximately 5 μm to 500 μm.

In some embodiments, a surface of the separator may further include a porous layer. The porous layer is disposed on at least one surface of the substrate of the separator. The porous layer includes inorganic particles and a binder. The inorganic particles are at least one selected from aluminum oxide ($Al_2O_3$), silicon oxide ($SiO_2$), magnesium oxide (MgO), titanium oxide ($TiO_2$), hafnium dioxide ($HfO_2$), tin oxide ($SnO_2$), ceria ($CeO_2$), nickel oxide (NiO), zinc oxide (ZnO), calcium oxide (CaO), zirconium oxide ($ZrO_2$), yttrium oxide ($Y_2O_3$), silicon carbide (SiC), boehmite, aluminum hydroxide, magnesium hydroxide, calcium hydroxide, or barium sulfate. In some embodiments, a diameter of a pore of the separator is within a range of approximately 0.01 μm to 1 μm. The binder in the porous layer is at least one selected from polyvinylidene difluoride, poly(vinylidene difluoride-co-hexafluoropropylene), polyamide, polyacrylonitrile, polyacrylic ester, polyacrylic acid, sodium polyacrylate, sodium carboxymethyl cellulose, polyvinylpyrrolidone, polyvinyl ether, polymethyl methacrylate, polytetrafluoroethylene, and polyhexafluoropropylene. The porous layer on the surface of the separator can improve heat resistance, oxidation resistance, and electrolyte infiltration performance of the separator, and enhance adhesion between the separator and the electrode plate.

In some embodiments of this application, the electrode assembly of the electrochemical device is a jelly-roll electrode assembly or a stacked electrode assembly.

In some embodiments of this application, the electrochemical device includes, but is not limited to, a lithium-ion battery. In some embodiments, the electrochemical device may further include an electrolyte. The electrolyte may be one or more of a gel electrolyte, a solid-state electrolyte, or an electrolytic solution. The electrolytic solution includes a lithium salt and a nonaqueous solvent. The lithium salt is one or more selected from $LiPF_6$, $LiBF_4$, $LiAsF_6$, $LiClO_4$, $LiB(C_6H_5)_4$, $LiCH_3SO_3$, $LiCF_3SO_3$, $LiN(SO_2CF_3)_2$, $LiC(SO_2CF_3)_3$, $LiSiF_6$, LiBOB, and lithium difluoroborate. For example, the lithium salt is $LiPF_6$ because it provides a high ionic conductivity and improves cycle characteristics.

The nonaqueous solvent may be a carbonate compound, a carboxylate compound, an ether compound, another organic solvent, or any combination thereof.

The carbonate compound may be a chain carbonate compound, a cyclic carbonate compound, a fluorocarbonate compound, or any combination thereof.

Examples of the chain carbonate compound are diethyl carbonate (DEC), dimethyl carbonate (DMC), dipropyl carbonate (DPC), methyl propyl carbonate (MPC), ethylene propyl carbonate (EPC), ethyl methyl carbonate (EMC), or any combination thereof. Examples of the cyclic carbonate compound are ethylene carbonate (EC), propylene carbonate (PC), butylene carbonate (BC), vinyl ethylene carbonate (VEC), or any combination thereof. Examples of the fluorocarbonate compound are fluoroethylene carbonate (FEC), 1,2-difluoroethylene carbonate, 1,1-difluoroethylene carbonate, 1,1,2-trifluoroethylene carbonate, 1,1,2,2-tetrafluoroethylene carbonate, 1-fluoro-2-methyl ethylene, 1-fluoro-1-methyl ethylene carbonate, 1,2-difluoro-1-methyl ethylene carbonate, 1,1,2-trifluoro-2-methyl ethylene carbonate, trifluoromethyl ethylene carbonate, or any combination thereof.

Examples of the carboxylate compound are methyl acetate, ethyl acetate, n-propyl acetate, tert-butyl acetate, methyl propionate, ethyl propionate, propyl propionate, γ-butyrolactone, decanolactone, valerolactone, mevalonolactone, caprolactone, methyl formate, or any combination thereof.

Examples of the ether compound are dibutyl ether, tetraglyme, diglyme, 1,2-dimethoxyethane, 1,2-diethoxyethane, ethoxy-methoxyethane, 2-methyltetrahydrofuran, tetrahydrofuran, or any combination thereof.

Examples of the other organic solvent are dimethyl sulfoxide, 1,2-dioxolane, sulfolane, methyl sulfolane, 1,3-dimethyl-2-imidazolidinone, N-methyl-2-pyrrolidone, formamide, dimethylformamide, acetonitrile, trimethyl phosphate, triethyl phosphate, trioctyl phosphate, phosphate ester, or any combination thereof.

In some embodiments of this application, using a lithium-ion battery as an example, the lithium-ion battery is prepared by: winding or stacking the positive electrode plate, the separator, and the negative electrode plate sequentially into an electrode assembly, putting the electrode assembly into a package such as an aluminum plastic film ready for sealing, injecting an electrolytic solution, and performing chemical formation and sealing. Subsequently, a performance test is performed on the prepared lithium-ion battery.

A person skilled in the art understands that the method for preparing the electrochemical device (for example, the lithium-ion battery) described above is merely an example. To the extent not departing from the content disclosed herein, other methods commonly used in the art may be employed.

An embodiment of this application further provides an electronic device containing the electrochemical device. The electronic device according to this embodiment of this application is not particularly limited, and may be any electronic device known in the prior art. In some embodiments, the electronic device may include, but without being limited to, a notebook computer, pen-inputting computer, mobile computer, e-book player, portable phone, portable fax machine, portable photocopier, portable printer, stereo headset, video recorder, liquid crystal display television set, handheld cleaner, portable CD player, mini CD-ROM, transceiver, electronic notepad, calculator, memory card, portable voice recorder, radio, backup power supply, motor, automobile, motorcycle, power-assisted bicycle, bicycle, lighting appliance, toy, game console, watch, electric tool, flashlight, camera, large household battery, lithium-ion capacitor, and the like.

Some specific embodiments and comparative embodiments are enumerated below to give a clearer description of this application, using a lithium-ion battery as an example.

Embodiment 1

Preparing a positive electrode plate: Dissolving lithium cobalt oxide as a positive active material, conductive carbon black as a conductive agent, and polyvinylidene difluoride (PVDF) as a binder at a weight ratio of 96.7:1.7:1.6 in an N-methyl-pyrrolidone (NMP) solution to form a positive slurry. Using an aluminum foil as a positive current collector, coating the positive current collector with the positive slurry in an amount of 18.37 mg/cm$^2$, and performing drying, cold pressing, and cutting to obtain a positive electrode plate.

Preparing a negative electrode plate: Dissolving a silicon-based material SiO, graphite, conductive carbon black as a conductive agent, and polyacrylic acid (PAA) as a binder at a mass ratio of 100:900:10:25 in deionized water to form a slurry of an active material layer. Using a copper foil as a negative current collector, coating the negative current collector with the negative slurry in an amount of 9.3 mg/cm$^2$, and performing drying and cutting to obtain a negative electrode plate.

Preparing a separator: Using 8 μm-thick polyethylene (PE) as a substrate of the separator, coating both sides of the substrate of the separator with a 2-μm thick aluminum oxide ceramic layer. Finally, applying polyvinylidene fluoride (PVDF) as a binder by an amount of 2.5 mg onto both sides that have been coated with a ceramic layer, and performing drying.

Preparing an electrolytic solution: Adding $LiPF_6$ into a nonaqueous organic solvent in an environment in which a water content is less than 10 ppm, where the nonaqueous organic solvent is prepared by mixing propylene carbonate (PC), ethylene carbonate (EC), and diethyl carbonate (DEC) at a mass ratio of 1:1:1, and the concentration of the $LiPF_6$ is 1.15 mol/L. Subsequently, adding 12.5 wt % fluoroethylene carbonate (FEC), and stirring well to obtain an electrolytic solution.

Preparing a lithium-ion battery: Stacking the positive electrode plate, the separator, and the negative electrode plate sequentially in such a way that the separator is located between the positive electrode plate and the negative electrode plate to serve a function of separation, and winding the stacked structure to obtain an electrode assembly. Putting the electrode assembly in an aluminum-plastic film that serves as an outer package, dehydrating the electrode assembly at 80° C., injecting the electrolytic solution, and sealing the package. Performing steps such as chemical formation, degassing, and edge trimming to obtain a lithium-ion battery.

The operations in other embodiments and comparative embodiments are the same as those in Embodiment 1 except changed parameter values. The specific changed parameter values are shown in the Table 1 below. The parameters and test results are shown in Table 2.

The following describes the test method of each parameter in this application.

Testing the silicon content of the negative electrode plate:

Picking an electrode assembly, and discharging the electrochemical system at 0.5 C at a temperature of 25° C. until a fully discharged state (the electrochemical system is discharged until a voltage of 3.0 V to reach the fully discharged state when the positive active material is lithium cobalt oxide, and the full-discharge voltage of other electrochemical systems is determined by a person skilled in the art depending on the electrochemical system). Disassembling the electrode assembly and taking out a negative electrode plate for testing.

Preheating a muffle furnace at 400° C., weighing out 0.05 to 1 gram of specimen, and putting the specimen into a crucible. Weighing out 1.2 to 1.5 grams of dry KOH reagent, and putting the reagent into the crucible. Putting on the lid of the crucible, and placing crucible on a crucible holder. Placing the crucible holder into the muffle furnace that has been heated up to 400° C., letting the mixture melt for about 45 minutes (until the liquid KOH completely covers the specimen). Taking out the crucible holder to cool down after the specimen is melted. Taking an appropriate amount of pure water in a clean beaker, and putting the pure water onto an electrical furnace for pre-boiling. Moving the cooled crucible and crucible lid into a clean 200 ml plastic beaker by use of nickel tweezers. Picking about 50 ml of boiling water, and adding the water into the beaker. Soaking the crucible lid and the crucible in the boiling water for about 60 minutes until the crucible lid and the crucible are fully wet. Removing the crucible and the crucible lid by use of tweezers, and cleaning the inner and outer walls of the crucible as well as the front and back of the crucible lid for about 2 to 3 times by use of a pure water bottle that drains water in a small amount. Filtering the specimen solution into a 100 ml polypropylene (PP) volumetric flask by use of medium-speed filter paper, and bringing the solution to a predetermined volume. Mixing well the solution that has been brought to a predetermined volume, moving 1 ml of specimen solution into a 100 ml volumetric flask by use of a pipette or a plastic pipet, and then adjusting the volume of the solution to 100 ml. Subsequently, performing an ICP test.

Testing the lithium content of the negative electrode plate:

Picking an electrochemical device, and discharging the electrochemical system at 0.5 C at a temperature of 25° C. until a fully discharged state (the electrochemical system is discharged until a voltage of 3.0 V to reach the fully discharged state when the positive active material is lithium cobalt oxide, and the full-discharge voltage of other electrochemical systems is determined by a person skilled in the art depending on the electrochemical system). Disassembling the electrode assembly and taking out a negative electrode plate for testing.

Picking 5 or more places on the negative electrode plate randomly, and punching the places into small discs that each cover the same area. Placing the small discs into a digestion tank, adding a digestion reagent, and placing the digestion tank into a microwave digester for digestion. Rinsing the lid with ultrapure water for 2 to 3 times after digestion, and pouring the rinse solution into the digestion tank. Subsequently, performing an ICP test.

Thermogravimetric analysis (TG) for the negative electrode plate:

Picking an electrochemical device, and discharging the electrochemical system at 0.5 C at a temperature of 25° C. until a fully discharged state (the electrochemical system is discharged until a voltage of 3.0 V to reach the fully discharged state when the positive active material is lithium cobalt oxide, and the full-discharge voltage of other electrochemical systems is determined by a person skilled in the art depending on the electrochemical system). Disassembling the electrode assembly and taking out a negative electrode plate for testing.

Picking 5 or more places on the negative electrode plate randomly, and punching the places into small discs that each cover the same area. Putting the small discs into an instrument (model: STA449F3-QMS403C) for heating, and increasing the temperature to 800° C. at a heating rate of 10° C./min in a protective atmosphere that is $N_2$ of a 99.99% purity. The flow rate of a purging gas is 60 mL/min, and the flow rate of the protective gas is 20 mL/min. During the heating, a curve of a weight that gradually decreases with the rise of the temperature, that is, a thermal weight loss curve, can be obtained. When the temperature rises to 800° C., a ratio of a weight decrement to an initial weight measured before the temperature rise is equal to the weight loss ratio of the negative electrode plate.

Testing the Resistance of the Negative Electrode Plate:

Measuring the resistivity of the electrode plate by a four-point probe method. Performing the four-point probe method by using a high-precision instrument that applies a DC voltage/current source (model: SB118); and fixing four copper probes linearly at equal spacings apart from each other, where each copper probe is 1.5 cm (length)×1 cm (width)×2 mm (thickness) in size, the spacing between the two middle copper probes is L (1 to 2 cm), and a substrate on which the copper probes are fixed is insulative. Pressing lower end faces of the four copper probes on the measured electrode plate during the test, applying a DC current I between the two copper probes at both ends, measuring the resultant voltage V between the two copper probes in the middle, reading the I and V values for three times, averaging out I and V, and using a V/I ratio as the electrode plate resistance at the measurement point.

Testing the Bonding Strength of the Negative Electrode Plate:

Testing the bonding force of the negative electrode plate by using a tensile tester. Cutting the negative electrode plate into a size of 15 mm×2 mm, sticking the cut-out negative electrode plate onto a stainless steel sheet by using 3M double-sided tape, and putting the negative electrode plate onto the tensile tester to measure the bonding force of the electrode plate.

XRD Test:

Weighing out 1.0 to 2.0 grams of the electrode plate specimen, pouring the specimen into a groove of a glass specimen holder, compacting and smoothing the specimen by using a glass sheet, and testing the specimen by using an X-ray diffractometer (Bruker-D8) according to JJS K 0131-1996 *General Rules for X-Ray Diffractometry*. Applying a voltage of 40 kV and a current of 30 mA for the test, scanning the specimen in an angle range of 10° to 85° at a step length to 0.0167°, and setting the time of each step length to 0.24 s, so as to obtain an XRD diffraction pattern. From the pattern, obtaining a maximum intensity value $I_2$ when the 2θ angle is 28.4° and a maximum intensity $I_1$ when the angle is 21.0°, and calculating an $I_2/I_1$ ratio value.

Particle Size Test:

Adding 0.02 gram of powder specimen into a 50 ml clean beaker, adding 20 ml of deionized water, and then adding a few drops of 1% surfactant to fully disperse the powder in the water. Sonicating the solution in a 120 W ultrasonic cleaner for 5 minutes, and testing the particle size distribution by using MasterSizer 2000.

High-Temperature Cycling Test:

Charging the battery at a constant current of 0.7 C under a 45° C. temperature until the voltage reaches 4.4 V, charging the battery at a constant voltage until the current reaches 0.025 C, leaving the battery to stand for 5 minutes, and then discharging the battery at a current of 0.5 C until the voltage reaches 3.0 V. Using the capacity obtained in this step as an initial capacity. Performing a cycle test in which the battery is charged at 0.7 C and discharged at 0.5 C. Comparing the capacity obtained in each step with the initial capacity to obtain a plurality of ratios. Plotting a capacity fading curve by using the ratios.

Testing a Full-Charge Expansion Rate:

Measuring a thickness of a half-charged fresh electrode assembly by using a spiral micrometer, and performing charge-and-discharge cycles until completion of 400 cycles. Measuring, by using the spiral micrometer, the thickness of the electrode assembly when the electrode assembly is in a fully charged state. Comparing the thickness at this time with the initial thickness of the half-charged fresh electrode assembly to obtain an expansion rate of the fully charged electrode assembly at this time.

Testing the Discharge Rate:

Discharging the battery at a 0.2 C current rate under a temperature of 25° C. until the voltage reaches 3.0 V. Leaving the battery to stand for 5 minutes. Charging the battery at 0.5 C until the voltage reaches 4.4 V. Charging the battery at a constant voltage until the current reaches 0.05 C. Leaving the battery to stand for 5 minutes. Adjusting the discharge rate and performing discharge tests at a C-rate of 0.2 C, 0.5 C, 1 C, 1.5 C, and 2.0 C separately to obtain different discharge capacities. Calculating a ratio of the capacity of the battery discharged at each C-rate to the capacity of the battery discharged at 0.2 C, and determining the rate performance by comparing the ratio.

Testing the Direct Current Resistance (DCR):

Testing the actual capacity of the electrode assembly at 25° C. by using Maccor test equipment (charging the battery at a constant current of 0.7 C until the voltage reaches 4.4 V, charging the battery at a constant voltage until the current reaches 0.025 C, and leaving the battery to stand for 10 minutes; and then discharging the battery at 0.1 C until the voltage reaches 3.0 V, and leaving the battery to stand for 5 minutes). Discharging the battery at 0.1 C until the state of charge (SOC) reaches specified values, and continuing the discharge for 1 s during which the voltage is sampled at intervals of 5 ms. Calculating DCR values under different SOC values.

Table 1 and Table 2 show parameters and evaluation results of embodiments and comparative embodiments.

TABLE 1

| Serial number | Silicon-based material/ dosage (g) | $I_2/I_1$ ratio value | $Dv_{50}$ (μm) | $Dn_{10}/Dv_{50}$ | Carbon material graphite (g) | Binder (g) | Conductive agent (g) | Dispersion time of silicon-based material mixed with carbon material (h) | Dispersion time of binder added (h) |
|---|---|---|---|---|---|---|---|---|---|
| 1 | SiO/100 g | 0.62 | 5.3 | 0.5 | 900 g | PAA (25 g) | Conductive carbon black/10 g | 1.5 h | 2 h |
| 2 | SiO/100 g | 0.62 | 5.3 | 0.5 | 150 g | PAA (25 g) | Conductive carbon black/10 g | 1.5 h | 2 h |
| 3 | SiO/100 g | 0.62 | 5.3 | 0.5 | 400 g | PAA (25 g) | Conductive carbon black/10 g | 1.5 h | 2 h |
| 4 | SiO/100 g | 0.62 | 5.3 | 0.5 | 1900 g | PAA (25 g) | Conductive carbon black/10 g | 1.5 h | 2 h |
| 5 | SiO/100 g | 0.62 | 5.3 | 0.5 | 900 g | CMC (25 g) | Conductive carbon black/10 g | 1.5 h | 2 h |
| 6 | SiO/100 g | 0.62 | 5.3 | 0.5 | 900 g | CMC (12.5 g) + PAA (12.5 g) | Conductive carbon black/10 g | 1.5 h | 2 h |
| 7 | SiO/100 g | 0.62 | 5.3 | 0.5 | 900 g | PAA-Li/25 g | Conductive carbon black/10 g | 1.5 h | 2 h |
| 8 | SiO/100 g | 0.62 | 5.3 | 0.5 | 900 g | PAA (10 g) | Conductive carbon black/10 g | 1.5 h | 2 h |
| 9 | SiO/100 g | 0.62 | 5.3 | 0.5 | 900 g | PAA (50 g) | Conductive carbon black/10 g | 1.5 h | 2 h |

TABLE 1-continued

| Serial number | Silicon-based material/ dosage (g) | $I_2/I_1$ ratio value | $Dv_{50}$ (μm) | $Dn_{10}/Dv_{50}$ | Carbon material graphite (g) | Binder (g) | Conductive agent (g) | Dispersion time of silicon-based material mixed with carbon material (h) | Dispersion time of binder added (h) |
|---|---|---|---|---|---|---|---|---|---|
| 10 | SiO/100 g | 0.62 | 5.3 | 0.5 | 900 g | PAA (100 g) | Conductive carbon black/10 g | 1.5 h | 2 h |
| 11 | SiO/100 g | 0.62 | 5.3 | 0.5 | 900 g | PAA (25 g) | Conductive carbon black/10 g | 0.5 h | 2 h |
| 12 | SiO/100 g | 0.62 | 5.3 | 0.5 | 900 g | PAA (25 g) | Conductive carbon black/10 g | 2 h | 2 h |
| 13 | SiO/100 g | 0.62 | 5.3 | 0.5 | 900 g | PAA (25 g) | Conductive carbon black/10 g | 1.5 h | 0.5 h |
| 14 | SiO/100 g | 0.62 | 5.3 | 0.5 | 900 g | PAA (25 g) | Conductive carbon black/10 g | 1.5 h | 3 h |
| 15 | Silicon-carbon compound (100 g) | — | 8.5 | — | 900 g | PAA (25 g) | Conductive carbon black/10 g | 1.5 h | 2 h |
| 16 | Ferrosilicon alloy (100 g) | — | 6.9 | — | 900 g | PAA (25 g) | Conductive carbon black/10 g | 1.5 h | 2 h |
| 17 | Li-containing SiO (100 g) | — | 6.6 | 0.5 | 900 g | PAA (25 g) | Conductive carbon black/10 g | 1.5 h | 2 h |
| 18 | SiO/100 g | 0.42 | 5.2 | 0.5 | 900 g | PAA (25 g) | Conductive carbon black/10 g | 1.5 h | 2 h |
| 19 | SiO/100 g | 1 | 5.4 | 0.5 | 900 g | PAA (25 g) | Conductive carbon black/10 g | 1.5 h | 2 h |
| 20 | SiO/100 g | 0.62 | 5.4 | 0.3 | 900 g | PAA (25 g) | Conductive carbon black/10 g | 1.5 h | 2 h |
| 21 | SiO/100 g | 0.62 | 5.3 | 0.6 | 900 g | PAA (25 g) | Conductive carbon black/10 g | 1.5 h | 2 h |
| Comparative Embodiment 1 | SiO/100 g | 0.62 | 5.3 | 0.5 | 900 g | PAA (5 g) | Conductive carbon black/10 g | 1.5 h | 2 h |
| Comparative Embodiment 2 | SiO/100 g | 0.62 | 5.3 | 0.5 | 900 g | PAA (25 g) | Conductive carbon black/10 g | 0.2 h | 2 h |
| Comparative Embodiment 3 | SiO/100 g | 0.62 | 5.3 | 0.5 | 900 g | PAA (25 g) | Conductive carbon black/10 g | 1.5 h | 0.2 h |
| Comparative Embodiment 4 | SiO/100 g | 2.4 | 5.3 | 0.5 | 900 g | PAA (25 g) | Conductive carbon black/10 g | 1.5 h | 2 h |
| Comparative Embodiment 5 | SiO/100 g | 0.62 | 5.4 | 0.05 | 900 g | PAA (25 g) | Conductive carbon black/10 g | 1.5 h | 2 h |
| Comparative Embodiment 6 | SiO/100 g | 0.62 | 5.5 | 0.8 | 900 g | PAA (25 g) | Conductive carbon black/10 g | 1.5 h | 2 h |
| Comparative Embodiment 7 | Silicon-carbon compound (100 g) | — | 8.5 | — | 900 g | PAA (25 g) | Conductive carbon black/10 g | 0.2 h | 2 h |
| Comparative Embodiment 8 | Silicon-carbon compound (100 g) | — | 8.5 | — | 900 g | PAA (25 g) | Conductive carbon black/10 g | 1.5 h | 0.2 h |
| Comparative Embodiment 9 | Ferrosilicon alloy (100 g) | — | 6.9 | — | 900 g | PAA (25 g) | Conductive carbon black/10 g | 0.2 h | 2 h |
| Comparative Embodiment 10 | Ferrosilicon alloy (100 g) | — | 6.9 | — | 900 g | PAA (25 g) | Conductive carbon black/10 g | 1.5 h | 0.2 h |
| Comparative Embodiment 11 | Li-containing SiO (100 g) | — | 6.6 | 0.5 | 900 g | PAA (25 g) | Conductive carbon black/10 g | 0.2 h | 2 h |
| Comparative Embodiment 12 | Li-containing SiO (100 g) | — | 6.6 | 0.5 | 900 g | PAA (25 g) | Conductive carbon black/10 g | 1.5 h | 0.2 h |

TABLE 2

| Serial number | $X_1$ (%) | $X_2$ (%) | M | $Y_1$ (%) | $Y_2$ (%) | N | $Z_1$ (%) | $Z_2$ (%) | K |
|---|---|---|---|---|---|---|---|---|---|
| Embodiment 1 | 5.12 | 5.56 | 0.92 | 10.74 | 1.03 | 0.72 | 1.95 | 2.32 | 0.84 |
| Embodiment 2 | 19.5 | 23.8 | 0.82 | 2.89 | 4.52 | 0.64 | 6.51 | 7.62 | 0.85 |
| Embodiment 3 | 8.67 | 10.00 | 0.87 | 1.62 | 2.38 | 0.68 | 3.45 | 4.10 | 0.84 |
| Embodiment 4 | 2.12 | 2.23 | 0.95 | 0.42 | 0.51 | 0.82 | 0.87 | 1.02 | 0.85 |
| Embodiment 5 | 5.21 | 5.62 | 0.93 | 0.76 | 1.04 | 0.73 | 1.65 | 1.91 | 0.86 |
| Embodiment 6 | 5.18 | 5.59 | 0.93 | 0.75 | 1.04 | 0.72 | 1.78 | 2.05 | 0.87 |
| Embodiment 7 | 5.20 | 5.65 | 0.92 | 0.80 | 1.07 | 0.75 | 1.75 | 2.03 | 0.86 |
| Embodiment 8 | 5.24 | 5.86 | 0.89 | 0.77 | 1.08 | 0.71 | 0.78 | 0.89 | 0.88 |
| Embodiment 9 | 5.11 | 5.45 | 0.94 | 0.71 | 0.88 | 0.81 | 3.78 | 4.49 | 0.84 |
| Embodiment 10 | 4.96 | 5.69 | 0.87 | 0.69 | 1.06 | 0.65 | 7.56 | 9.58 | 0.79 |
| Embodiment 11 | 4.98 | 5.89 | 0.85 | 0.69 | 0.99 | 0.70 | 2.04 | 2.36 | 0.86 |
| Embodiment 12 | 5.06 | 5.45 | 0.93 | 0.72 | 0.88 | 0.83 | 2.02 | 2.35 | 0.86 |
| Embodiment 13 | 4.97 | 5.51 | 0.90 | 0.68 | 0.96 | 0.71 | 1.89 | 2.42 | 0.78 |
| Embodiment 14 | 5.10 | 5.51 | 0.93 | 0.69 | 0.82 | 0.84 | 1.98 | 2.21 | 0.90 |
| Embodiment 15 | 1.46 | 1.60 | 0.91 | 0.05 | 0.06 | 0.79 | 1.95 | 2.32 | 0.84 |
| Embodiment 16 | 3.98 | 4.35 | 0.91 | 10.17 | 0.22 | 0.78 | 1.96 | 2.36 | 0.83 |
| Embodiment 17 | 4.85 | 5.27 | 0.92 | 0.79 | 1.04 | 0.76 | 1.87 | 2.23 | 0.84 |
| Embodiment 18 | 5.12 | 5.57 | 0.92 | 0.75 | 1.03 | 0.73 | 1.97 | 2.33 | 0.85 |
| Embodiment 19 | 5.14 | 5.54 | 0.93 | 10.72 | 1.00 | 0.72 | 2.00 | 2.35 | 0.85 |
| Embodiment 20 | 5.09 | 5.65 | 0.90 | 0.71 | 0.96 | 0.74 | 2.03 | 2.37 | 0.86 |
| Embodiment 21 | 5.11 | 5.62 | 0.91 | 10.74 | 0.99 | 0.75 | 2.02 | 2.38 | 0.85 |
| Comparative Embodiment 1 | 5.15 | 7.15 | 0.72 | 0.68 | 1.39 | 0.49 | 0.34 | 0.39 | 0.87 |
| Comparative Embodiment 2 | 4.66 | 6.73 | 0.69 | 0.61 | 1.33 | 0.46 | 2.03 | 2.38 | 0.85 |
| Comparative Embodiment 3 | 4.90 | 5.50 | 0.89 | 0.65 | 0.97 | 0.67 | 1.75 | 2.66 | 0.66 |
| Comparative Embodiment 4 | 5.08 | 5.50 | 0.92 | 0.69 | 0.95 | 0.73 | 2.02 | 2.35 | 0.86 |
| Comparative Embodiment 5 | 4.88 | 5.46 | 0.89 | 0.82 | 1.21 | 0.68 | 1.98 | 2.30 | 0.86 |
| Comparative Embodiment 6 | 4.92 | 5.59 | 0.88 | 0.73 | 1.03 | 0.71 | 2.01 | 2.38 | 0.84 |
| Comparative Embodiment 7 | 1.21 | 1.80 | 0.67 | 0.04 | 0.096 | 0.41 | 1.93 | 2.34 | 0.82 |
| Comparative Embodiment 8 | 1.42 | 1.65 | 0.86 | 10.04 | 0.06 | 0.67 | 1.45 | 2.40 | 0.60 |
| Comparative Embodiment 9 | 3.37 | 4.96 | 0.68 | 0.12 | 0.32 | 0.38 | 1.86 | 2.26 | 0.82 |
| Comparative Embodiment 10 | 3.87 | 4.45 | 0.87 | 0.13 | 0.19 | 0.70 | 1.51 | 2.46 | 0.61 |
| Comparative Embodiment 11 | 4.75 | 7.31 | 0.65 | 0.68 | 1.45 | 0.47 | 1.85 | 2.18 | 0.85 |
| Comparative Embodiment 12 | 4.91 | 5.58 | 0.88 | 10.82 | 1.15 | 0.71 | 1.74 | 2.95 | 0.59 |

TABLE 2-continued

| Serial number | Thickness of electrode plate (μm) | Compacted density of a single side (g/cm³) | Bonding strength of electrode plate (N/m) | Average resistance of electrode plate (mΩ) | Number of cycles when capacity fades to 80% | Expansion rate of fully charged electrode assembly after 400 cycles | Discharge rate (2 C discharge capacity/ 0.2 C discharge capacity) | DCR (measured at a room temperature when the SOC is 10%, mΩ) |
|---|---|---|---|---|---|---|---|---|
| Embodiment 1 | 91 | 1.75 | 32 | 24.5 | 420 | 6.8% | 88.9% | 62 |
| Embodiment 2 | 55 | 1.65 | 54 | 550.4 | 205 | 16.2% | 86.7% | 86 |
| Embodiment 3 | 75 | 1.70 | 44 | 235.1 | 314 | 11.5% | 92.6% | 75 |
| Embodiment 4 | 111 | 1.78 | 26 | 11.4 | 734 | 4.6% | 86.9% | 53 |
| Embodiment 5 | 91 | 1.75 | 29 | 21.5 | 415 | 7.0% | 89.2% | 63 |
| Embodiment 6 | 91 | 1.75 | 31 | 23.2 | 432 | 6.6% | 89.3% | 62 |
| Embodiment 7 | 9 | 1.75 | 30 | 22.4 | 428 | 6.8% | 91.2% | 56 |
| Embodiment 8 | 90 | 1.75 | 21 | 23.5 | 384 | 7.2% | 90.2% | 63 |
| Embodiment 9 | 93 | 1.75 | 42 | 27.4 | 445 | 6.5% | 87.2% | 67 |
| Embodiment 10 | 97 | 1.75 | 65 | 29.8 | 321 | 5.9% | 80.2% | 77 |
| Embodiment 11 | 91 | 1.75 | 32 | 25.4 | 376 | 7.6% | 85.6% | 67 |
| Embodiment 12 | 91 | 1.75 | 31 | 23.6 | 425 | 6.7% | 89.0% | 61 |
| Embodiment 13 | 91 | 1.75 | 27 | 25.3 | 325 | 7.6% | 86.1% | 68 |
| Embodiment 14 | 9 | 1.75 | 35 | 22.7 | 433 | 6.6% | 89.3% | 61 |
| Embodiment 15 | 127 | 1.75 | 32 | 24.5 | 330 | 12.1% | 88.9% | 62 |
| Embodiment 16 | 119 | 1.75 | 30 | 22.3 | 342 | 11.8% | 89.2% | 64 |
| Embodiment 17 | 124 | 1.75 | 34 | 23.1 | 387 | 9.1% | 90.5% | 59 |
| Embodiment 18 | 91 | 1.75 | 32 | 24.8 | 450 | 6.3% | 89.9% | 58 |
| Embodiment 19 | 91 | 1.75 | 33 | 24.8 | 395 | 7.2% | 86.8% | 64 |
| Embodiment 20 | 91 | 1.75 | 33 | 23.5 | 402 | 6.9% | 90.3% | 57 |
| Embodiment 21 | 91 | 1.75 | 32 | 24.2 | 455 | 6.8% | 88.0% | 64 |
| Comparative Embodiment 1 | 91 | 1.75 | 16 | 22.5 | 359 | 7.5% | 88.5% | 68 |
| Comparative Embodiment 2 | 91 | 1.75 | 29 | 25.3 | 321 | 8.9% | 82.1% | 72 |
| Comparative Embodiment 3 | 91 | 1.75 | 19 | 26.2 | 287 | 8.2% | 85.1% | 74 |
| Comparative Embodiment 4 | 91 | 1.75 | 34 | 24.9 | 351 | 8.0% | 83.7% | 70 |
| Comparative Embodiment 5 | 91 | 1.75 | 33 | 23.3 | 376 | 7.3% | 92.0% | 56 |
| Comparative Embodiment 6 | 91 | 1.75 | 33 | 25.6 | 386 | 7.5% | 86.5% | 71 |
| Comparative Embodiment 7 | 127 | 1.75 | 32 | 25.5 | 247 | 14.2% | 82.7% | 73 |
| Comparative Embodiment 8 | 127 | 1.75 | 18 | 25.9 | 257 | 14.5% | 81.9% | 76 |
| Comparative Embodiment 9 | 119 | 1.75 | 34 | 24.5 | 274 | 13.6% | 83.1% | 71 |

TABLE 2-continued

| | | | | | | | | |
|---|---|---|---|---|---|---|---|---|
| Comparative Embodiment 10 | 119 | 1.75 | 17 | 25.3 | 267 | 13.8% | 84.2% | 73 |
| Comparative Embodiment 11 | 124 | 1.75 | 33 | 23.6 | 305 | 10.5% | 87.4% | 69 |
| Comparative Embodiment 12 | 124 | 1.75 | 21 | 24.9 | 298 | 10.3% | 86.9% | 71 |

Figure 3:
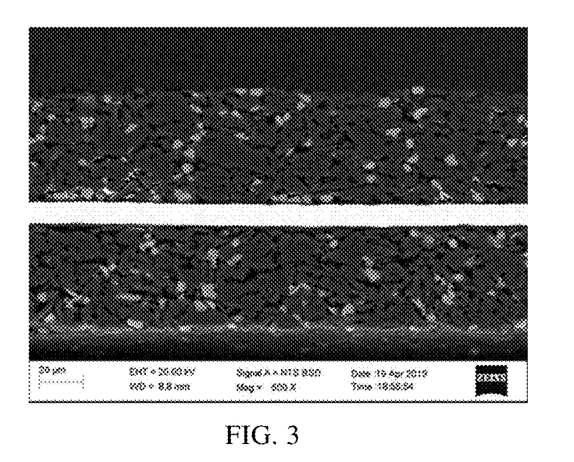
FIG. 3 is a cross-sectional view of a negative electrode plate according to Embodiment 1.
Figure 4:
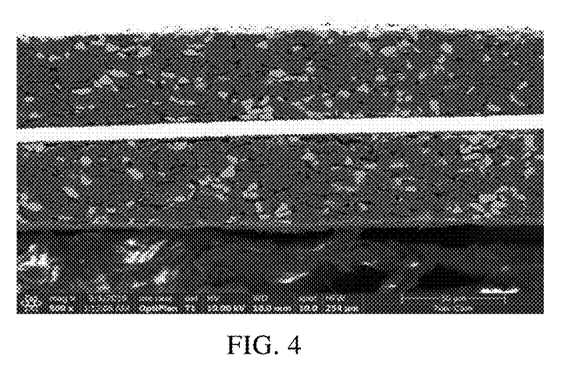
FIG. 4 is a cross-sectional view of a negative electrode plate according to Embodiment 2.
Figure 5:
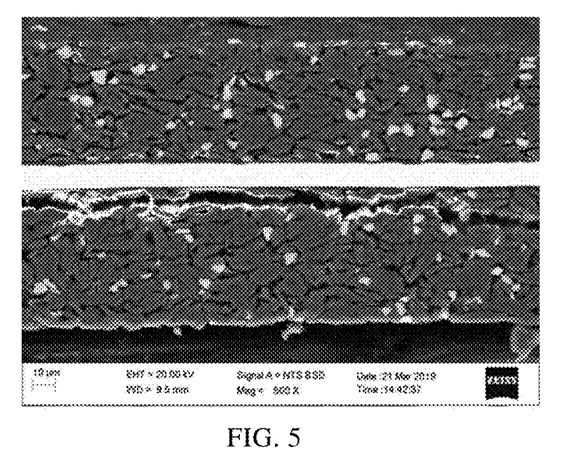
FIG. 5 is a cross-sectional view of a negative electrode plate according to Embodiment 4.

As can be seen from comparison between Embodiments 1 to 4, a decline in the mass percent of the silicon-based material enhances the dispersion uniformity of the silicon-based material in the graphite, and increases the value of M. In addition, with the decline in the mass percent of the silicon-based material, the content of residual lithium in the negative electrode plate decreases, and the value of N increases. An increase in the mass percent of the silicon-based material enhances the rate performance of the electrochemical device. However, when the mass percent of the silicon-based material increases to 40% or more, the conductivity is insufficient, and in turn, causes deterioration of the rate performance of the electrochemical device. In addition, the increase in the mass percent of the silicon-based material causes deterioration of the cycle performance and expansion of the electrochemical device. FIG. 3 and FIG. 5 show cross-sectional views of negative electrode plates according to Embodiments 1, 2, and 4 respectively.

As can be seen from comparison between Embodiments 1, 5, 6, and 7, the binders made of sodium carboxymethyl-cellulose (CMC), polyacrylic acid (PAA), and lithium polyacrylic acid (PAA-Li) that are added at the same mass percent respectively exert the same effect, and can play a role of dispersing the silicon-based material particles and bonding the silicon-based material particles. When the binder is made of PAA-Li, the Li content in the negative electrode plate is increased, thereby increasing the Li ion diffusion rate and enhancing the rate performance of the electrochemical device.

As can be seen from comparison between Embodiments 1, 8, 9, and 10 and Comparative Embodiment 1, the decline in the content of PAA in the binder enhances the dispersibility of the binder and the rate performance of the electrochemical device, but leads to deterioration of the dispersibility of the silicon-based material, nonuniformity of the distribution of Li, a lower bonding effect, and deterioration of the cycle performance and expansion of the electrochemical device. With the increase of the content of PAA in the binder, the excessive dosage of the binder leads to a low dispersibility, deteriorates the dispersibility of the silicon-based material, and leads to nonuniformity of the distribution of Li. An excessive dosage of the binder deteriorates the rate performance of the electrochemical device, and deteriorates the cycle performance of the electrochemical device and the expansion of the electrode assembly.

Figure 6:
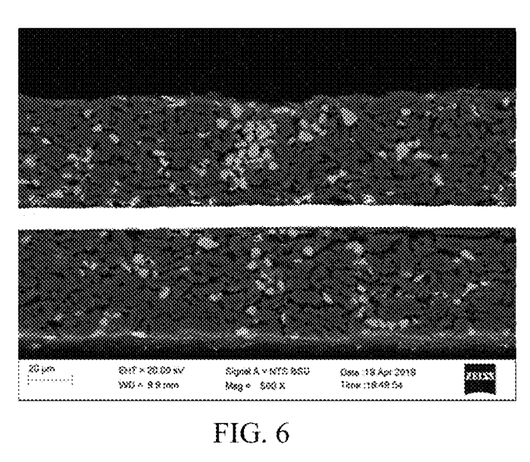
FIG. 6 is a cross-sectional view of a negative electrode plate according to Comparative Embodiment 2.

As can be seen from comparison between Embodiments 1, 11, and 12 and Comparative Embodiment 2, the time of mixing the silicon-based materials and the graphite is deficient (less than 1.5 h), and therefore, the silicon-based material is not effectively dispersed, and the values of M and N are decreased, thereby deteriorating the rate performance, cycle performance, and electrode assembly expansion of the electrochemical device. When the time of mixing the silicon-based material and graphite reaches 1.5 h or more, the silicon-based material can be uniformly dispersed. Further increase in the time of mixing exerts little impact on the increase of the values of M and N. FIG. 3 shows a cross-sectional view of a negative electrode plate according to Embodiment 1, and FIG. 6 shows a cross-sectional view of a negative electrode plate according to Comparative Embodiment 2. Evidently, the material uniformity in the active material layer of Embodiment 1 is higher than that of Comparative Embodiment 2, and agglomeration occurs in Comparative Embodiment 2 to some extent.

As can be seen from comparison between Embodiments 1, 13, and 14 and Comparative Embodiments 3, a longer dispersion time of the binder increases the dispersion uniformity (a higher Z value) of the binder, increases the dispersion uniformity (a higher M value) of the silicon-based material, and increases the dispersion uniformity (a higher N value) of Li, thereby improving the rate performance and cycle performance of the electrochemical device and reducing the volume expansion of the electrode assembly during cycling.

As can be seen from comparison between Embodiments 1, 15, 16, and 17 and Comparative Embodiments 7 to 12, for different silicon-based materials, in order to achieve higher rate performance and cycle performance and a lower expansion rate of the electrode assembly, both the silicon-based material and the binder need to be dispersed uniformly. Depending on the type of material, the content of Li in the electrode plate varies sharply. When the silicon-based material is SiO or lithium-containing SiO, the content of Li in the negative electrode plate is high.

As can be seen from comparison between Embodiments 1, 18, and 19 and Comparative Embodiment 4, when the $I_2/I_1$ ratio is lower, the impact on the dispersion uniformity of silicon-based material and the uniformity of lithium is smaller, but the effect is more significant on improving the rate performance and cycle performance of the electrochemical device and alleviating volume expansion of the electrode assembly.

As can be seen from comparison between Embodiments 1, 20, and 21 and Comparative Embodiments 5 and 6, if the $Dn_{10}/Dv_{50}$ ratio is deficient, the dispersion uniformity of the silicon-based material will be lower (the M value is lower) and the N value is also lower, thereby deteriorating the cycle performance of the electrochemical device. However, the existence of the silicon-based material of a small particle size enhances the rate performance of the electrochemical devices. If the $Dn_{10}/Dv_{50}$ ratio is excessive, the dispersion uniformity of the silicon-based material will also deteriorate, and at the same time, the cycle performance and rate performance of the electrochemical device and the volume expansion of the electrode assembly will deteriorate.

Therefore, the dispersion uniformity of both the silicon-based material and the binder (the dispersion uniformity of the silicon-based material affects the dispersion uniformity of Li) exerts a significant effect on improving the rate performance and cycle performance of the electrochemical device and alleviating volume expansion of the electrode assembly.

What is described above is merely exemplary embodiments of this application and the technical principles thereof. A person skilled in the art understands that the scope of disclosure in this application is not limited to the technical solutions formed by a specific combination of the foregoing technical features, but covers other technical solutions formed by arbitrarily combining the foregoing technical features or equivalents thereof, for example, a technical solution formed by replacing any of the foregoing features with a technical feature disclosed herein and serving similar functions.

What is claimed is:

1. A negative electrode plate, comprising:
   a current collector; and
   an active material layer, disposed on the current collector, wherein
   the active material layer comprises a silicon-based material, a carbon material, and a binder; and
   a mass fraction of silicon in a first region of the active material layer is $X_1$ and a mass fraction of silicon in a second region of the active material layer is $X_2$, wherein the first region and the second region have a same area but are located in different positions, $X_2 \geq X_1$, $M=X_1/X_2$, and $M \geq 0.7$; and
   a mass fraction of lithium in the first region of the active material layer is $Y_1$ and a mass fraction of lithium in the second region of the active material layer is $Y_2$, $Y_2 \geq Y_1$, $N=Y_1/Y_2$, and $0.5 \leq N \leq 0.84$.

2. The negative electrode plate according to claim 1, wherein a mass percent of the silicon-based material in the active material layer is 2 wt % to 80 wt %.

3. The negative electrode plate according to claim 1, wherein the binder comprises a lithium salt component.

4. The negative electrode plate according to claim 1, wherein a mass percent of the binder in the active material layer is 0.5 wt % to 10 wt %.

5. The negative electrode plate according to claim 1, wherein the silicon-based material comprises at least one of Si, $SiO_x$, $SiO_2$, SiC, $Li_2SiO_5$, $Li_2SiO_3$, $Li_4SiO_4$, or silicon alloy, $0.6 \leq x \leq 1.5$, and a particle size of Si is less than 100 nm.

6. The negative electrode plate according to claim 1, wherein, in an X-ray diffraction pattern of the silicon-based material, a maximum intensity value is $I_1$ when $2\theta$ falls within a range of 20.5° to 21.5°, and the maximum intensity value is $I_2$ when $2\theta$ falls within a range of 28.0° to 29.0°; and $0 < I_2/I_1 \leq 1$.

7. The negative electrode plate according to claim 1, wherein a particle size distribution of the silicon-based material satisfies: $0.3 \leq Dn_{10}/Dv_{50} \leq 0.6$;
   wherein $Dn_{10}$ refers to a particle diameter at which a cumulative number percentage of measured particles reaches 10% of a total number of particles under test in a number-based particle size distribution; and
   $Dv_{50}$ refers to a particle diameter at which a cumulative volume percentage of measured particles reaches 50% of a total volume of particles under test in a volume-based particle size distribution.

8. The negative electrode plate according to claim 1, wherein
   an average particle diameter of the silicon-based material is 500 nm to 30 μm.

9. The negative electrode plate according to claim 1, wherein the binder comprises at least one of carboxymethyl cellulose, polyacrylic acid, polyvinylpyrrolidone, polyaniline, polyimide, polyamideimide, polysiloxane, polystyrene-butadiene rubber, epoxy resin, polyester resin, polyurethane resin, or polyfluorene.

10. The negative electrode plate according to claim 1, wherein a weight loss ratios of the first region and the second region of the active material layer in a thermogravimetric analysis (TG) performed at a temperature less than or equal to 800° C. are $Z_1$ and $Z_2$ respectively, $Z_2 \geq Z_1$, $K=Z_1/Z_2$, and $K \geq 0.7$.

11. The negative electrode plate according to claim 1, wherein the active material layer further comprises a conductive agent; and the conductive agent comprises at least one of single-walled carbon nanotubes, multi-walled carbon nanotubes, vapor grown carbon fibers, conductive carbon black, acetylene black, Ketjen black, conductive graphite, or graphene.

12. The negative electrode plate according to claim 1, wherein a mass percent of the silicon-based material in the active material layer is 2% to 40%; and
   the carbon material comprises graphite.

13. An electrochemical device, comprising:
   a positive electrode plate;
   a negative electrode plate; and
   a separator, disposed between the positive electrode plate and the negative electrode plate, wherein
   the negative electrode plate is the negative electrode plate according to claim 1.

14. An electronic device, comprising the electrochemical device according to claim 13.

* * * * *